United States Patent [19]

Bernstein et al.

[11] 4,122,133

[45] Oct. 24, 1978

[54] MATERIAL FOR AN ALKALINE CELL SEPARATOR AND A PROCESS OF MAKING

[75] Inventors: Philip Bernstein, Yardley; James P. Coffey, Hatboro; Alan E. Varker, Philadelphia, all of Pa.

[73] Assignee: ESB Incorporated, Phildelphia, Pa.

[21] Appl. No.: 780,579

[22] Filed: Mar. 23, 1977

[51] Int. Cl.$^2$ .................... C08F 255/00; C08F 8/34
[52] U.S. Cl. .................... 260/878 R; 204/159.18; 429/206
[58] Field of Search ............... 260/878 R; 204/159.18

[56] References Cited

U.S. PATENT DOCUMENTS

| | | | |
|---|---|---|---|
| 3,240,723 | 3/1966 | Friedlander | 260/878 R |
| 3,247,133 | 4/1966 | Chen et al. | 260/878 R |
| 3,862,266 | 1/1975 | McConnell et al. | 260/878 R |
| 3,873,643 | 3/1975 | Wu et al. | 260/878 R |
| 3,928,497 | 12/1975 | Ohmori et al. | 260/878 R |

*Primary Examiner*—Alan Holler
*Attorney, Agent, or Firm*—Gilbert W. Rudman; Anthony J. Rossi; Gary V. Pack

[57] ABSTRACT

A material useful as a separator in batteries and a process for making the material is provided. This material is a polyolefin having grafted to it side chains derived from an ethylenically unsaturated ionogenic monomer and cross-linked with sulfur.

7 Claims, No Drawings

MATERIAL FOR AN ALKALINE CELL SEPARATOR AND A PROCESS OF MAKING

BACKGROUND OF THE INVENTION

1. Field of the Invention

The present invention relates to a grafted and cross-linked polyolefin material and a process for making it. More particularly, it relates to the use of this material as a separator in batteries; especially alkaline batteries.

2. Prior Art

Recent years have seen the rapid development of various alkaline battery systems. These systems include silver-zinc, mercury-zinc, nickel-cadmium, silver-cadmium, manganese-zinc, and mercury-cadmium. The silver-zinc cells are of particular interest as they exhibit a high energy to weight ratio. Partly for this reason, silver-zinc cells have found particular application in military, commercial and aero space uses. Alkaline cells typically require a separator between the anode and cathode to effect a physical barrier to prevent internal shorting. A great deal of effort has been expended in the search for an appropriate separator for alkaline cells. The separator must be permeable so that ions can travel from one plate to another. As noted above, the separator must have sufficent physical strength to prevent internal shorting. Further, the separator should not so impede the progress of ions migrating through the electrolyte so as to markedly raise the impedence of the cell. Finally, the separator material must be capable of withstanding the chemically hostile environment produced by the combination of the electrolyte (typically a strong caustic such as potassium hydroxide or sodium hydroxide) and oxidation due to strong oxidizers such as divalent silver which is often used as a positive electrode.

One substance which has found wide use as a separator is modified polyethylene film. In order to effect the migration of ions within the cell, the polyethylene film is often graft polymerized using an ethylenically unsaturated monomer whereby carboxyl groups are grafted onto the polyethylene film and act as carriers for ionic charge through the separator material. In some cases, porous polyethylene sheet is treated with methacrylic acid and laminated between sheets of cellophane. The latter type of separator while effective is quite brittle and fractures easily making it difficult to handle and form. The former type of grafted separator conventionally is in the form of a thin film of polyethylene which is exposed to activated radiation and submerged in a solution of methacrylic acid. Because of the cross-linking of the polyethylene film, the extent of grafting is limited by the degree of swelling which the film is capable of undergoing. Therefore the bulk of the separator is substantially free of grafts. To date, most polyethylene separators (both with and without cellophane laminates) are undesirable brittle. The resistances of other type separators through oxidation is not satisfactory with the resultant shelf-life of the alkaline cell incorporating them unduly short.

It would be highly desirable to provide an improved separator for alkaline cells which has none of the foregoing deficiencies. It is therefore an object of the present invention to provide a material useful as a separator for alkaline cells which is physically tougher than those previously produced. A further object of the invention is to provide a material for an alkaline cell separator having a substantially improved shelf life. Yet another object is to provide a material and process for forming an improved alkaline cell separator. Another object is to provide a material and method of preparing a cell separator which exhibits superior resistance to the powerful oxidizing action of divalent silver oxide cathodes. A further object is to provide a material and method of preparing a separator which because of its oxidative stability allows the realization of the full capacity of the electrochemical couple.

SUMMARY OF THE INVENTION

According to the present invention, there is provided a material comprised of a polyolefin having grafted thereon side chains derived from ethylenically unsaturated ionogenic monomers and further which is cross-linked by sulfur. This graft polyolefin can be formed by a process which has as a starting material a quantity of finely divided polyolefin having ethylenically unsaturated ionogenic monomers grafted thereon. The grafted polymer is then fused. During fusing, powdered sulfur is added to the finely divided polyolefin and distributed substantially uniformly therethrough. The polyolefin sulfur blend is exposed to ultraviolet light to enhance cross-linking. The cross-linked grafted polyolefin can be shaped into any form desired by conventional processes.

DESCRIPTION OF THE INVENTION

The polyolefins which are utilizable in this invention include polyethylene, polypropylene, polybutene and polyisoprene. Preferred are polyethylene and polypropylene. The more preferred is polyethylene. Although both high density and low density polyethylene can be used, it has been found that low density polyethylene reacts more completely and hence is even more preferred. By "low density" is meant, polyethylene exhibiting a density of less than 0.92 grams per cubic centimeter.

The polyolefin should be finely divided. By "finely divided" is meant, a polyolefin having particles which have an average diameter of about 5 to 50 microns. Preferably, the diameter of these particles will range from 15 to 25 microns.

Side chains can be derived from ethylenically unsaturated ionogenic monomers. Suitable monomers are sodium styrene sulfonate, sodium vinyl sulfonate, crotonic acid, methacrylic acid, acrylic acid, vinyl pyridine, vinyl benzylchloride, vinyl pyrolidine and the like. The preferred monomers are acrylic acid and methacrylic acid. The most preferred monomer is methacrylic acid which produces a graft polymer containing carboxyl groups.

Sulfur is used to cross-link the polyolefin during exposure to ultraviolet light while fusing. The sulfur is a purified sulfur such as flowers of sulfur, recovered sulfur or sublime sulfur. The amount of sulfur ranges from 2 to 20% by weight of the grafted polyolefin. The preferred range is 10 to 20% sulfur by weight of the grafted polyolefin. The most preferred is about 15%.

One process for forming the grafted cross-linked polyolefin is providing a quantity of finely divided polyolefin having an ethylenically unsaturated ionogenic monomer grafted thereon and fusing said graft polyolefin. During fusing, a powdered sulfur is added and distributed substantially uniformly throughout the finely divided grafted polyolefin and the mixture is exposed to ultraviolet light. Finally, the grafted cross-linked polyolefin is shaped into a film or any other desired shape by conventional thermoset plastic means.

Various methods of preparing sites on the polyolefin suitable for grafting are known in the prior art and include the use of gamma radiation, Van de Graffe radiation, ultraviolet radiation and ozonizing a polyolefin film.

In a preferred embodiment and as more fully set forth in co-pending U.S. patent application Ser. No. 780,578 filed Mar. 23, 1977 by the present inventors, the finely divided polyolefin is ozonized by maintaining it in a fluidized bed.

In that process, a small amount (at least 0.1% by weight) of powdered silica is necessary to achieve fluidity and to prevent agglomeration of the polyolefin particles. Preferred is the use of 0.5 to 5% of silica, especially fumed silica. The most preferred amount is about 0.5%. At this level the silica provides the necessary fluidity without substantially entering into the reactions during ozonization or in subsequent processing.

The fluidizing bed is maintained in a state of constant agitation to assist in the process. Ozone is introduced into the inflowing gas so as to pass through the fluidized material and come into intimate contact with the finely divided polyolefin. The silica polyolefin is activated by the ozone. By "activated" is meant, the preparation of the polyolefin for subsequent grafting wherein incipient labile sites are produced at various points along the chain like molecules of the polyolefin.

When low density polyethylene is utilized, the ozonization is continued until the amount of ozone absorbed is approximately 500–600 Ml, preferably about 540 milligrams of ozone per 100 grams of polyethylene. The degree of ozonization is commonly measured by the Iodometric determination of the peroxide value of the polyethylene, as is known by those skilled in the art.

In this process, the peroxide values may range from 20 to 60 mole peroxide per kilogram of polyethylene. The preferred values for use in this invention are from 30 to 40 mole per kilogram. Even more preferred is a peroxide value of about 38 mole per kilogram.

One way to achieve ozonization while maintaining the polyolefin in a fluidized bed placing the finely divided polyolefin in a vessel having a diffuser at its bottom and forcing air or similar carrier gas upwardly through the diffuser and through the body of the finely divided polyolefin so as to maintain the polyolefin in a fluidized state and to insure the even distribution of activated sites through the polyolefin.

The activated polyolefin may then reacte with the ethylenically unsaturated ionogenic monomer.

Polymerization of the activated polymer with ethylenically unsaturated ionogenic monomer is loading the activated polyolefin material into an appropriate container with an aqueous solution of the monomer and then refluxing. In this manner, the activated polyolefin is reacted with the ethylenically unsaturated ionogenic monomer to produce a graft polymer in which groups from the monomer are attached to the previously prepared labile sites.

By using activated low density polyethylene having a peroxide value from 20 to 60 and by varying the ratio of methacrylic acid to activated polyolefin, the resulting level of graft polymerization is from 30 to 440% by weight.

The grafted polyolefin may be converted into its salt form by reacting it with alkaline compounds. Suitable alkaline compounds are alkaline metal oxides and hydroxides, alkaline earth oxides and hydroxides, amines and amine hydroxides and the like. The preferred are alkali metal and ammonium hydroxide. The most preferred is potassium hydroxide. After conversion to the salt form, the polymer material may be washed and dried to form a finely divided grafted polymer powder which can be subsequently prepared as appropriate for a desired use.

After conversion to the salt form, the grafted polyolefin may be washed and dried to produce finely divided powder. While the grafted polyolefin may subsequently be formed into films and used as a separator for alkaline cells without further treatment, the present inventors have found that the properties of such a separator can be vastly enhanced through the addition of sulfur and exposure to ultraviolet light during fusing.

In one preferred process, the dried grafted polyolefin is applied to the rolls of a two roll rubber mill, the rolls being heated to a temperature in excess of the melting point of the polyolefin. As the polyolefin is added to the mill, a fused mass begins to build up on and between the rolls to which a powdered sulfur is added slowly. While the portions of sulfur may be varied as described above, in this embodiment a ratio of approximately 10 parts polyolefin to 1 part sulfur was found satisfactory.

While not necessary to the invention, a small amount of powder polytetrafluoroethylene (PTFE) can be added to the mix in approximate proportion of 10 parts sulfur to 1 part PTFE by weight. Further operation of the mill thoroughly distributes the powdered sulfur throughout the volume of the polyolefin and further sinters and fibulates the PTFE. This causes proliferation of long intertwined strands of PTFE oriented randomly throughout the mixture. While the PTFE is not believed to effect the chemical or electrochemical properties of the resulting material, it does provide a fibrous matrix which lends additional strength and resiliency to the material.

After the complete mixing of the sulfur and the grafted polyolefin, the mix is exposed to ultraviolet light. The ultra violet light exposure time is from 1 minute to 30 minutes. The preferred exposure time is within the range from 3 to 10 minutes. The most preferred exposure time is about 4 to 6 minutes. It has been found that beyond the 30 minutes time of exposure to ultraviolet light, the polyolefin becomes degraded.

In one embodiment, the exposure to ultraviolet light is accomplished by mounting a 1200 watt ultraviolet lamp approximately 3 inches from the surface of one of the moving mill rolls with the mill adjusted to produce a band having a thickness of approximately 0.006 inches. The bulk of the fused material is repeatedly fed around the rolls. As the material passes through the roll nip a new band is created such that the bulk of the mix continually presents a new surface to the ultraviolet light. Ultimately the entire volume of the material is exposed to ultraviolet light.

The foregoing is continued until the bulk of the mix has been exposed to the desired degree of ultraviolet light. The lamp is then turned off, removed from the mill roll area and the mill readjusted to produce a film of the desired thickness.

Other processes for mixing and exposing the material to ultraviolet light include the use of a Banberry mixer and having the ultraviolet light exposure on the holding mill. Another is using a mixer extruder in which the extruder film is exposed to ultraviolet light during calendaring. Films of the grafted polyolefin of the current invention can be produced. Preferably, the films will range from 2 to 15 mils thickness. However, thicker films can also be produced. The most preferred thickness for use as a separator in a battery is 4 to 10 mils. After cooling the film may be soaked in an alkaline wash, preferably a potassium hydroxide wash, for several hours and subsequently dried.

The material of this invention when formed into a film exhibits markedly improved physical properties. In particular, it is an extremely tough resilient material. Even more importantly from a standpoint of cell separators are the electrical and chemical characteristics of the film. The resistivity of the material is low, being in the range of approximately 20 ohms per centimeter.

Using the process of this invention, a wide variation of sulfur cross-linked grafted polyolefin, ultraviolet treated films have been formed. Grafted polyolefins having ozonization peroxide values of from 20 to 60 were subsequently treated with methacrylic acid to produce grafts ranging from 30 to 440 percent. They were blended and cross-linked with sulfur in amounts ranging from 2 to 20% by weight. Films have been formed of these materials. Based on the test results which are shown in Examples 1 through 17, the material which is most preferred as a separator will have the following characteristics.

Ozonization Peroxide value — 38
Methacrylic Acid Graft — 175%
Sulfur — 15%
Ultraviolet exposure time — 5 minutes
Film thickness — 4 to 7 mils
Potassium hydroxide — 40% solution The shelf life of alkaline cells having separators made from the above preferred material improves two fold, particularly when stored at elevated temperatures. The shelf life of cells employing this new material was substantially greater than commercially available material used in controlled cells designated RAI in Table 1. Moreover separators made in a like manner though without sulfur or ultraviolet light exposure exhibit a substantially shorter shelf life than those in which sulfur and ultraviolet light exposure was a constituent. The alkaline cells in which this material can be used as a separator also is comprised of a positive electrode, negative electrode, and an alkaline electrolyte in contact with electrode. The negative electrode is preferably zinc. The negative electrode is preferably silver oxide, either monovalent or divalent. The electrolyte is an alkali metal hydroxide, preferably silver NaOH or KOH. The following examples further illustrate and describe the invention and contain comparative results.

EXAMPLE 1

Material for a cell separator was prepared by placing low density polyethylene powder (Microtheme FN-500 sold by U.S.I. Corp.) having a particle size of approximately 20 microns into a container having an air-diffuser lower surface. One-half percent by weight of fumed silica powder (Cab-O-Sil sold by Cabot Corp.) was added. Ozone was passed through the fluidized polyethylene-silica until the amount of ozone absorbed was about 540 mg. ozone per 100 g of low density polyethylene. This amount of absorbtion has a peroxide value of 38, measured by the Iodometric method. From the above blend 280 g. of ozonized polyethylene was mixed with 4.3 liters of deionized water and 480 g of methacrylic acid. The mixture was heated to reflux temperature, and maintained at reflux, with stirring, for 4 hours. The reaction mixture was cooled and the precipitate was washed and then converted to the salt form in a mixture of 720 g of 45% KOH and 4 liters of methanol. Based on the neutralization equivalent the product was 175% graft in the potassium salt form. The product was filtered and dried preparatory to being processed into film.

A pre-heated two roll mill was prepared to receive 80 g of the powder product, heated on the mill to the molten state, and then 8 g sublimed sulfur (10% based on weight of powder) slowly added to the kneeling nip of the Mill. To the mixing mass 0.88 PTFE, (Dupont 6A powdered Teflon) was added. A 1200 W (GE Mercury Arc lamp, model 9T04-40170), was disposed approximately 3 inches from the turning roll, and parallel to the roll axis. The molten mix on the roll was allowed to repeatedly pass beneath the ultraviolet lamp for 5 minutes. The lamp was then turned off, the nip of the mill rolls closed and a 0.002 inch thick film fed from the mill. The film was laid on a flat surface, and allowed to cool. Subsequently, the films were soaked in 40% aqueous solution of KOH for six hours, then dried. Summary of various important values of Example #1;

Grafted Polyethylene
Ozone — Peroxide Value: 38
Sulfur Added: 10%
Methacrylic Acid Grafted: 175%
U.V. Light Exposure: 5 min.

This film was used as a separator in Ray-O-Vac type RW 44 silver button cells. These cells have zinc and divalent silver depolarizer mix electrodes.

Examples 2–17 show various separators used in tests of Ray-O-Vac RW 44 silver button cells. The film and batteries were prepared as in Example 1, except that the separators used had a variable(s) relating to either the peroxide value, methacrylic acid graft, amount of sulfur added or duration of ultraviolet light exposure.

The test program was as follows and the results are tabulated in table 1 which follows the examples.

Test Program

Ray-O-Vac type RW 44 silver-zinc button cells were employed. Separators as described in examples 2 thru 17 were used in the cells for evaluation. Cells using RAI-2192 separators were used as control cells. Prior to incorporation into the RW-44 cells, specific resistivity in ohms-cm was measured for each example and control.

Specific resistivity was measured by the method, "Electrical Resistance Alternating Current Method," as detailed in "Characteristics of Separators for Alkaline Silver Oxide Zinc Secondary Batteries," edited by J. E. Cooper Air Force Aero Propulsion Laboratory Wright-Patterson AFB Ohio and Arthur Fleischer, Consultant Electrochemistry & Chemical Technology, AD-447301, 1970.

Initial capacity is the capacity of a freshly built cell given in milliampere hours. Cells were allowed to stand at least overnight before testing.

The data reports results at 300 ohm and 625 ohm constant load for 16 hours per day.

The delayed data was obtained at either 300 ohm or 625 ohm load discharge for 16 hours per day after storage at 130° F., 50% relative humidity for 4, 8 and 12 weeks respectively. High temperatures were used to accelerate life testing, and shorten test programs. The capacity retention was derived by dividing the capacity after stated periods of time by the original capacity of the fresh cell and multiplying by 100.

Shelf life data is reported as a ratio of number of cells failing, to number of cells tested at 130° F. and 160° F. A cell was considered to have failed when the voltage indicated less than 0.9 volts.

EXAMPLE 2

Material for a cell separator was prepared in Example 1, the below listed summary indicated the variations employed:
Grafted Polyethylene
    Ozone — Peroxide Value: 20
    Sulfur Added: 10%
    Methacrylic Acid Graft: 150%
    U.V. Light Exposure: 5 min.
Testing program and comparative results are listed below.

EXAMPLE 3

Material for a cell separator was prepared as in Example 1, the below listed summary indicated the variations employed:
Grafted Polyethylene
    Ozone — Peroxide Value: 20
    Sulfur Added: 10%
    Methacrylic Acid Graft: 150%
    U.V. Light Exposure: 10 min.
Testing program and comparative results are listed below.

EXAMPLE 4

Material for a cell separator was prepared as in Example 1, the below listed summary indicated the variations employed:
Grafted Polyethylene
    Ozone — Peroxide Value: 20
    Sulfur Added: 15%
    Methacrylic Acid Graft: 150%
    U.V. Light Exposure: 5 min.
Testing program and comparative results are listed below.

EXAMPLE 5

Material for a cell separator was prepared as in Example 1, the below listed summary indicated the variations employed:
Grafted Polyethylene
    Ozone — Peroxide Value: 20
    Sulfur Added: 15%
    Methacrylic Acid Graft: 150%
    U.V. Light Exposure: 10 Min.
Testing program and comparative results are listed below.

EXAMPLE 6

Material for a cell separator was prepared as in Example 1, the below listed summary indicated the variation employed:
Grafted Polyethylene
    Ozone — Peroxide Value: 20
    Sulfur Added: 10%
    Methacrylic Acid Graft: 200%
    U.V. Light Exposure: 5 min.
Testing program and comparative results are listed below.

EXAMPLE 7

Material for a cell separator was prepared as in Example 1, the below listed summary indicated the variations employed:
Grafted Polyethylene
    Ozone — Peroxide Value: 20
    Sulfur Added: 10%
    Methacrylic Acid Graft: 200% U.V. Light Exposure: 10 Min.
Testing program and comparative results are listed below.

EXAMPLE 8

Material for a cell separator was prepared as in Example 1, the below listed summary indicated the variations employed:
Grafted Polyethylene
    Ozone — Peroxide Value: 20
    Sulfur Added: 15%
    Methacrylic Acid Graft: 200%
    U.V. Light Exposure 5 min.
Testing program and comparative results are listed below.

EXAMPLE 9

Material for a cell separator was prepared as in Example 1, the below listed summary indicated the variations employed:
Grafted Polyethylene
    Ozone — Peroxide Value: 20
    Sulfur Added: 15%
    Methacrylic Acid Graft: 200%
    U.V. Light Exposure: 10 min.
Testing program and comparative results are listed below.

EXAMPLE 10

Material for a cell separator was prepared as in Example 1, the below listed summary indicated the variations employed:
Grafted Polyethylene
    Ozone — Peroxide Value: 50
    Sulfur Added: 10%
    Methacrylic Acid Graft: 150%
    U.V. Light Exposure: 5 min.
Testing program and comparative results are listed below.

EXAMPLE 11

Material for a cell separator was prepared as in Example 1, the below listed summary indicates the variations employed:
Grafted Polyethylene
    Ozone — Peroxide Value: 50
    Sulfur Added: 10%
    Methacrylic Acid Graft: 150%
    U.V. Light Exposure: 10 min.
Testing program and comparative results are listed below.

EXAMPLE 12

Material for a cell separator was prepared as in Example 1, the below listed summary indicated the variations employed:
Grafted Polyethylene
    Ozone — Peroxide Value: 50
    Sulfur Added: 15%

Methacrylic Acid Graft: 150%
U.V. Light Exposure: 5 min.
Testing program and comparative results are listed below.

EXAMPLE 13

Material for a cell separator was prepared as in Example 1, the below listed summary indicated the variations employed:
Grafted Polyethylene
    Ozone — Peroxide Value: 50
    Sulfur Added: 15%
    Methacrylic Acid Graft: 150% U.V. Light Exposure: 10 min.
Testing program and comparative results are listed below.

EXAMPLE 14

Material for a cell separator was prepared as in Example 1, the below listed summary indicated the variations employed:
Grafted Polyethylene
    Ozone — Peroxide Value: 50
    Sulfur Added: 10%
    Methacrylic Acid Graft: 200%
    U.V. Light Exposure: 5 min.
Testing program and comparative results are listed below.

EXAMPLE 15

Material for a cell separator was prepared as in Example 1, the below listed summary indicates the variations employed:
Grafted Polyethylene
    Ozone — Peroxide Value: 50
    Sulfur Added: 10%
    Methacrylic Acid Graft: 200%
    U.V. Light Exposure: 10 min.
Testing program and comparative results are listed below.

EXAMPLE 16

Material for a cell separator was prepared as in Example 1, the below listed summary indicates the varriations employed:
Grafted Polyethylene
    Ozone — Peroxide Value: 50
    Sulfur Added: 15%
    Methacrylic Acid Graft: 200%
    U.V. Light Exposure: 5 min.
Testing program and comparative results are listed below.

EXAMPLE 17

Material for a cell separator was prepared as in Example 1, the below listed summary indicated the variations employed:
Grafted Polyethylene
    Ozone — Peroxide Value: 50
    Sulfur Added: 15%
    Methacrylic Acid Graft: 200%
    U.V. Light Exposure: 10 min.
Comparative results are tabulated in Table 1.

EXAMPLES

| | 2 | 3 | 4 | 5 | 6 | 7 | 8 | 9 | 10 | 11 | 12 | 13 | 14 | 15 | 16 | 17 | | RAI |
|---|---|---|---|---|---|---|---|---|---|---|---|---|---|---|---|---|---|---|
| Specific Resistivity (OHM-CM.) | 73 | 61 | 52 | 86 | 23 | 27 | 24 | 26 | 22 | 22 | 26 | 23 | 20 | 22 | 21 | 25 | 20 | 20 |
| Initial Capacity 300Λ | 117 | 127 | 110 | 114 | 135 | 147 | 140 | 136 | 128 | 147 | 155 | 136 | 129 | 121 | 112 | 110 | 79 | 108 |
| 625Λ(16M/O) | 158 | 152 | 151 | 146 | 166 | 169 | 168 | 166 | 158 | 168 | 162 | 163 | 148 | 162 | 151 | 147 | 143 | 143 |
| Delayed MAH 300Λ16 HP | | | | | | | | | | | | | | | | | | |
| 4 weeks | | | | | 151 | 150 | 144 | 145 | 137 | 140 | 139 | 149 | 116 | 146 | 136 | 134 | | 99 |
| 8 weeks | | | | | 147 | 147 | 146 | 130 | 131 | 126 | 132 | 134 | 132 | 90 | 108 | 106 | | 78 |
| 12 weeks | | | | | 137 | 143 | 134 | 113 | 103 | 118 | 122 | 116 | — | — | — | — | | 61 |
| 625Λ 16MO | | | | | | | | | | | | | | | | | | |
| 4 weeks | 147 | 149 | 135 | 125 | — | — | — | — | — | — | — | — | — | — | — | — | 105 | |
| 8 weeks | 112 | 138 | 125 | 107 | — | — | — | — | — | — | — | — | — | — | — | — | 60 | |
| 12 weeks | 121 | 116 | 98 | 92 | — | — | — | — | — | — | — | — | — | — | — | — | 54 | |
| % Capacity Retention | | | | | | | | | | | | | | | | | | |
| 4 weeks | 93 | 98 | 89 | 86 | 100 | 100 | 100 | 100 | 100 | 95 | 90 | 100 | 78 | 90 | 90 | 91.1 | 73 | 92 |
| 8 weeks | 90 | 91 | 83 | 73 | 100 | 100 | 100 | 96 | 100 | 86 | 85 | 98 | 89 | 56 | 71 | 72 | 42 | 72 |
| 12 weeks | 77 | 76 | 65 | 63 | 100 | 97 | 96 | 83 | 805 | 80 | 79 | 85 | — | — | — | — | 38 | 56 |
| Shelf life 130° F 50% Rel Hum. | | | | | | | | | | | | | | | | | | |
| 4 weeks | 0/12 | 0/12 | 0/12 | 0/12 | 0/12 | 0/12 | 0/12 | 0/12 | 0/12 | 0/12 | 0/12 | 0/12 | 0/12 | 0/12 | 0/12 | 0/12 | 0/12 | 0/12 |
| 8 weeks | 1/9 | 0/9 | 0/9 | 0/9 | 0/9 | 0/9 | 0/9 | 0/9 | 0/9 | 0/9 | 0/9 | 0/9 | 4/9 | 6/9 | 4/9 | 4/9 | 0/9 | 0/9 |
| 12 weeks | 2/6 | 0/6 | 0/6 | 0/6 | 0/6 | 0/6 | 0/6 | 1/6 | 0/6 | 1/6 | 0/6 | 0/6 | 6/6 | 5/6 | 5/6 | 6/6 | 0/6 | 016 |
| 160° F | | | | | | | | | | | | | | | | | | |
| 1 week | 0/6 | 0/6 | 0/6 | 0/6 | 0/6 | 0/6 | 0/6 | 0/6 | 0/6 | 0/6 | 0/6 | 0/6 | 0/6 | 0/6 | 0/6 | 0/6 | 0/6 | 0/6 |
| 2 weeks | 0/6 | 0/6 | 0/6 | 0/6 | 0/6 | 1/6 | 1/6 | 0/6 | 0/6 | 1/6 | 0/6 | 0/6 | 1/6 | 0/6 | 0/6 | 0/6 | 0/6 | 0/6 |
| 3 weeks | 0/6 | 0/6 | 0/6 | 0/6 | 0/6 | 1/6 | 2/6 | 0/6 | 0/6 | 1/6 | 0/6 | 0/6 | 4/6 | 6/6 | 5/6 | 0/6 | 0/6 | 0/6 |
| 4 weeks | 0/6 | 0/6 | 0/6 | 0/6 | 5/6 | 4/6 | 3/6 | 2/6 | 3/6 | 4/6 | 4/6 | 0/6 | 6/6 | 6/6 | 3/6 | 5/6 | 0/6 | 4/6 |
| Room Temperature | | | | | | | | | | | | | | | | | | |
| 3 months | 0/6 | 0/6 | 0/6 | 0/6 | 0/7 | 0/7 | 0/7 | 0/7 | 0/7 | 0/7 | 0/7 | 0/7 | 0/6 | 0/6 | 0/6 | 0/6 | 0/6 | 0/6 |

DISCUSSION OF EXAMPLE 2-17

The data in Table 1 demonstrates the superior comparative rate capability of cells built with the separator made from the polymer material of the invention and cells constructed with commercially available material. The cells using the separator of this invention show superior rate capability at both the 300 ohm and 625 ohm discharge regimes. For example, in the actual milliampere hours, Example 6 cites cells with a capacity of 137 mah after 12 weeks storage at 130° F. 50% relative humidity, as compared to 61 mah for the commercially available material. This represents a capacity retention, in terms of the original capacity of 100% as compared to 56% for the commercial material. In terms of shelf life data, Examples 2, 3, 4, 5 and 13 show no failures after 4 weeks at 160° F., whereas one sample of commercial material shows 4 out of 6 cells failed at this temperature. This data then reflects the overall superior performance of cells using the separator made from the composition of this invention as compared to commercially available separators.

We claim:

1. A material comprised of a polyolefin having ethylenically unsaturated ionogenic monomers grafted thereon and cross-linked with sulfur.

2. The material of claim 1 wherein the polyolefin is polyethylene.

3. The material of claim 1 wherein the ethylenically unsaturated ionogenic monomer is acrylic acid or methacrylic acid.

4. The material of claim 1 wherein the polyolefin is polyethylene and the ethylenically unsaturated ionogenic monomer is methacrylic acid.

5. A separator for an alkaline cell comprised of a film of a polyolefin having grafted thereto side chains of ethylenically unsaturated ionogenic monomers and cross-linked with sulfur.

6. The separator of claim 5 wherein the polyolefin is polyethylene and the monomer is methacrylic acid.

7. The separator of claim 5 wherein the polyolefin is polyethylene and the monomer is methacrylic acid, having a level of graft polymerization of 30 to 440% based on the weight of polyethylene.